United States Patent [19]

Montanari et al.

[11] 4,069,650
[45] Jan. 24, 1978

[54] CROP GATHERING APPARATUS

[75] Inventors: Marc Montanari, Fresnes; Jean C. Van Dest, Risorangis, both of France

[73] Assignee: Massey-Ferguson Services N.V., Curacao, Netherlands

[21] Appl. No.: 727,206

[22] Filed: Sept. 27, 1976

[30] Foreign Application Priority Data

Oct. 15, 1975 United Kingdom ............... 42159/75

[51] Int. Cl.² ........................................... A01D 57/04
[52] U.S. Cl. .................................................. 56/221
[58] Field of Search ................................. 56/219–227, 56/14.3–14.6

[56] References Cited

U.S. PATENT DOCUMENTS

| 1,196,615 | 8/1916 | Thompson | 56/255 |
| 2,077,018 | 4/1937 | Schewe | 56/220 |
| 2,345,847 | 4/1944 | Wink | 56/221 |
| 2,430,298 | 11/1947 | MacGregor | 56/227 |
| 2,957,296 | 10/1960 | Waters | 56/220 |
| 3,319,408 | 5/1967 | Landwehr | 56/220 |
| 3,945,180 | 3/1976 | Sinclair | 56/221 |

FOREIGN PATENT DOCUMENTS

| 2,050,081 | 4/1972 | Germany | 56/220 |
| 2,411,153 | 9/1975 | Germany | 56/221 |

Primary Examiner—Russell R. Kinsey
Attorney, Agent, or Firm—Robert L. Farris

[57] ABSTRACT

The crop gathering reel of a combine is mounted on a pair of reel support arms each in the form of a hydraulic piston and cylinder assembly having widely spaced load-bearing lands which enable the arms to withstand the bending loads arising from supporting the reel in cantilever fashion while permitting adjustment of the reel position forwards and rearwards.

11 Claims, 9 Drawing Figures

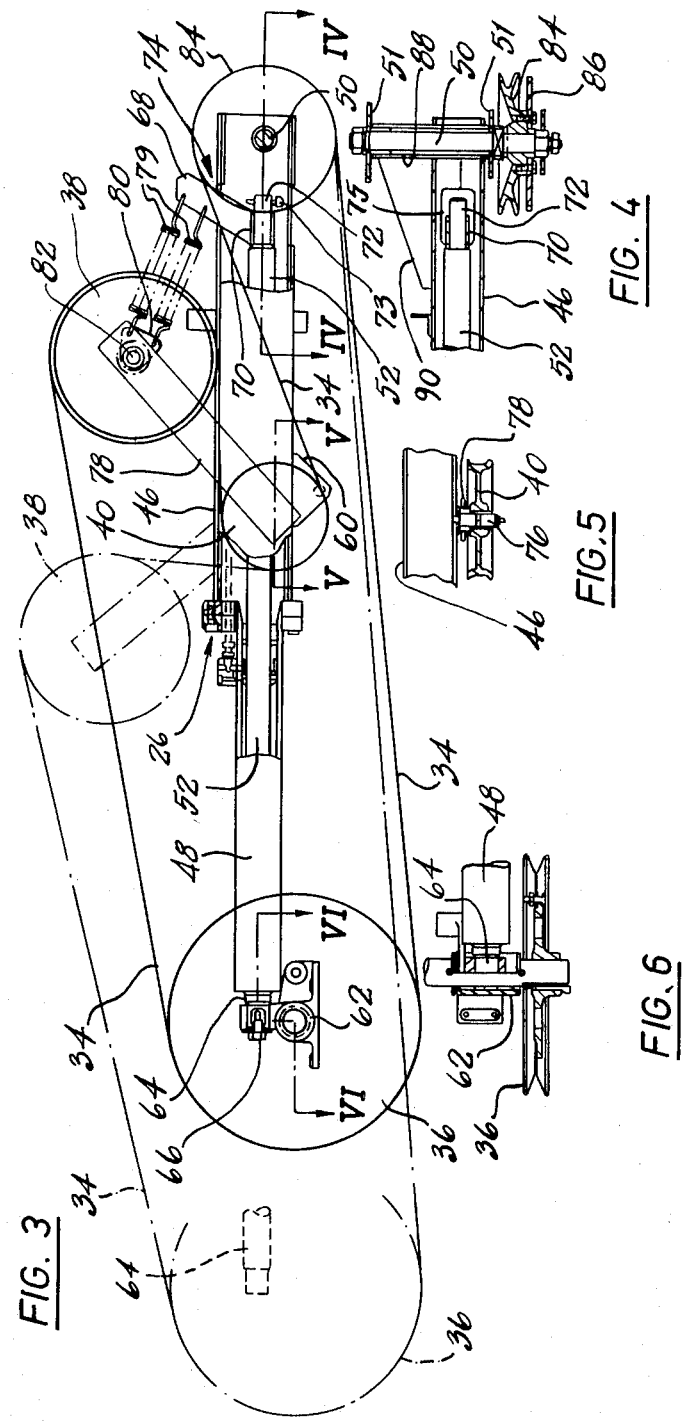

CROP GATHERING APPARATUS

This invention relates to crop gathering apparatus such as, for example, the crop gathering table of a swather or of a combined harvesting and threshing machine, or combine. Many of such tables are equipped with a reel to assist in the efficient gathering of the crop. The reel may be mounted on a pair of arms, one at each end of the reel, the arms being pivotally connected to the table.

Adjustment means is usually provided whereby the reel may be position-adjusted in the fore/aft direction relative to the direction of forward motion of the combine. However, such adjustment means have hitherto been mechanically complex and expensive. It is an object of the present invention to provide improved adjustment means for this purpose.

According to the invention there is provided crop gathering apparatus as defined in claim 1 of the accompanying claims.

The provision in a reel support arm of a hydraulic piston and cylinder assembly having widely spaced load-bearing lands enables said piston and cylinder assembly to perform the dual functions firstly of taking the bending loads involved in supporting the reel without the need for additional reel support arms to carry the weight of the reel, and secondly of adjusting the position of the reel forwards and rearwards relative to the crop gathering platform.

An embodiment of the invention will now be described by way of example with reference to the accompanying drawings, in which:

FIG. 3 shows a longitudinal section through the reel support arm of FIG. 2, the section being taken on the line III—III in FIG. 2;

FIGS. 4, 5 and 6 show sections through portions of the support means for the reel taken on the lines IV—IV, V—V and VI—VI in FIG. 3;

Figure 1:
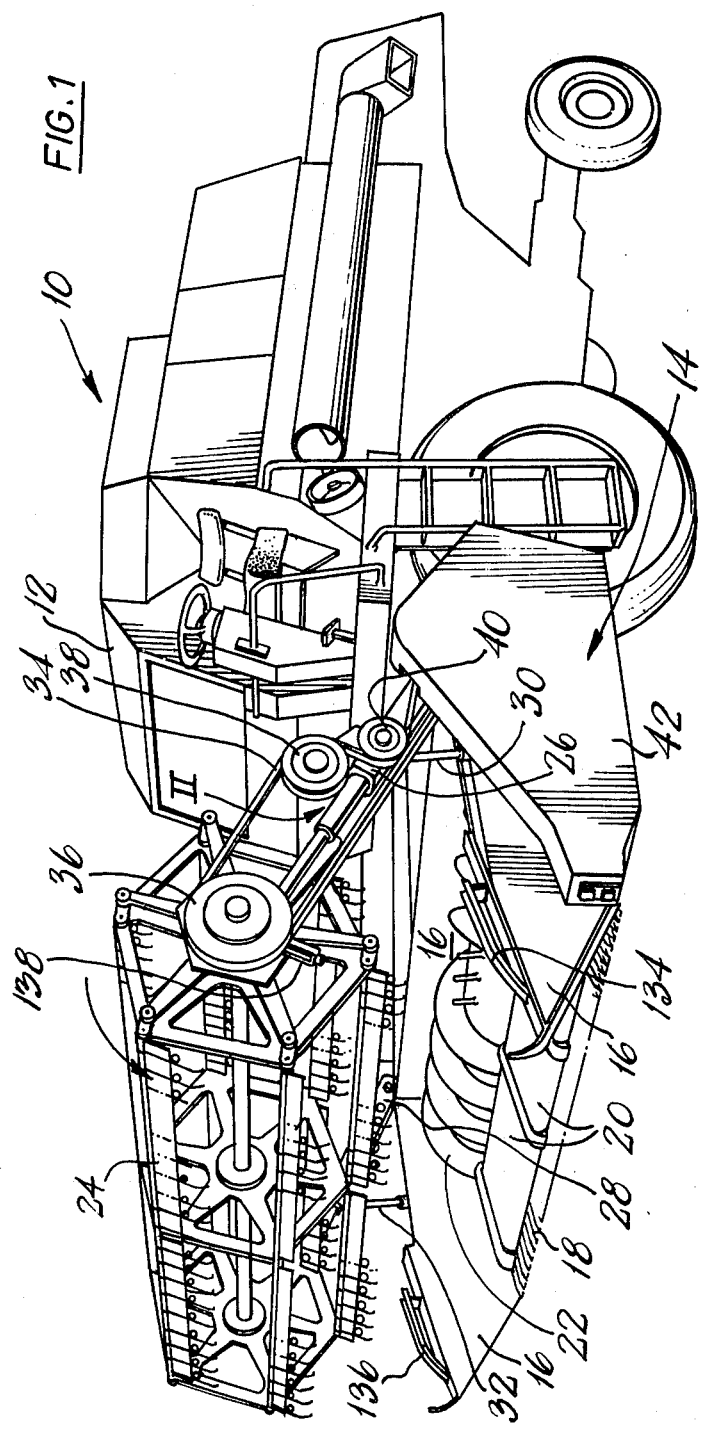
FIG. 1 shows a perspective view of a combine harvester having crop gathering apparatus including a reel and support arms for the reel.

As shown in FIG. 1 of the drawings a self propelled grain harvesting and threshing machine or combine 10 has a main body 12 and crop gathering apparatus 14 (referred-to in the art as a table) pivotally mounted on the front end of the main body for up and down movement under the control of a pair of hydraulic rams (not shown).

The crop gathering apparatus 14 comprises a crop gathering platform 16, a cutterbar 18, a belt-type draper conveyor 20, an auger 22 and a crop gathering reel 24.

Reel 24 is mounted on crop gathering platform 16 by a pair of forwardly extending reel support arms 26, 28 one at each end of the reel. Arms 26, 28 are each adjustable in length, as will be described, to provide forward and rearward adjustment of the position of the reel relative to the platform, to accommodate different crops and conditions.

The reel support arms 26, 28 are each pivotally connected to platform 16 to permit up and down movement of reel 24 in an arc. The height of the reel is controlled by a pair of upwardly extending hydraulic reel lift rams 30, 32 acting between arms 26, 28 and the platform.

Reel 24 is rotated in the direction indicated, by a vee belt 34 drivably engaging a driven pulley 36 fast with the reel, the belt extending round a tensioning pulley 38 and a guide pulley 40, as will be more fully described below.

A housing 42 at the left hand end of crop gathering platform 16 encloses the drives for cutterbar 18, draper conveyor 20, auger 22 and reel 24.

Figure 2:
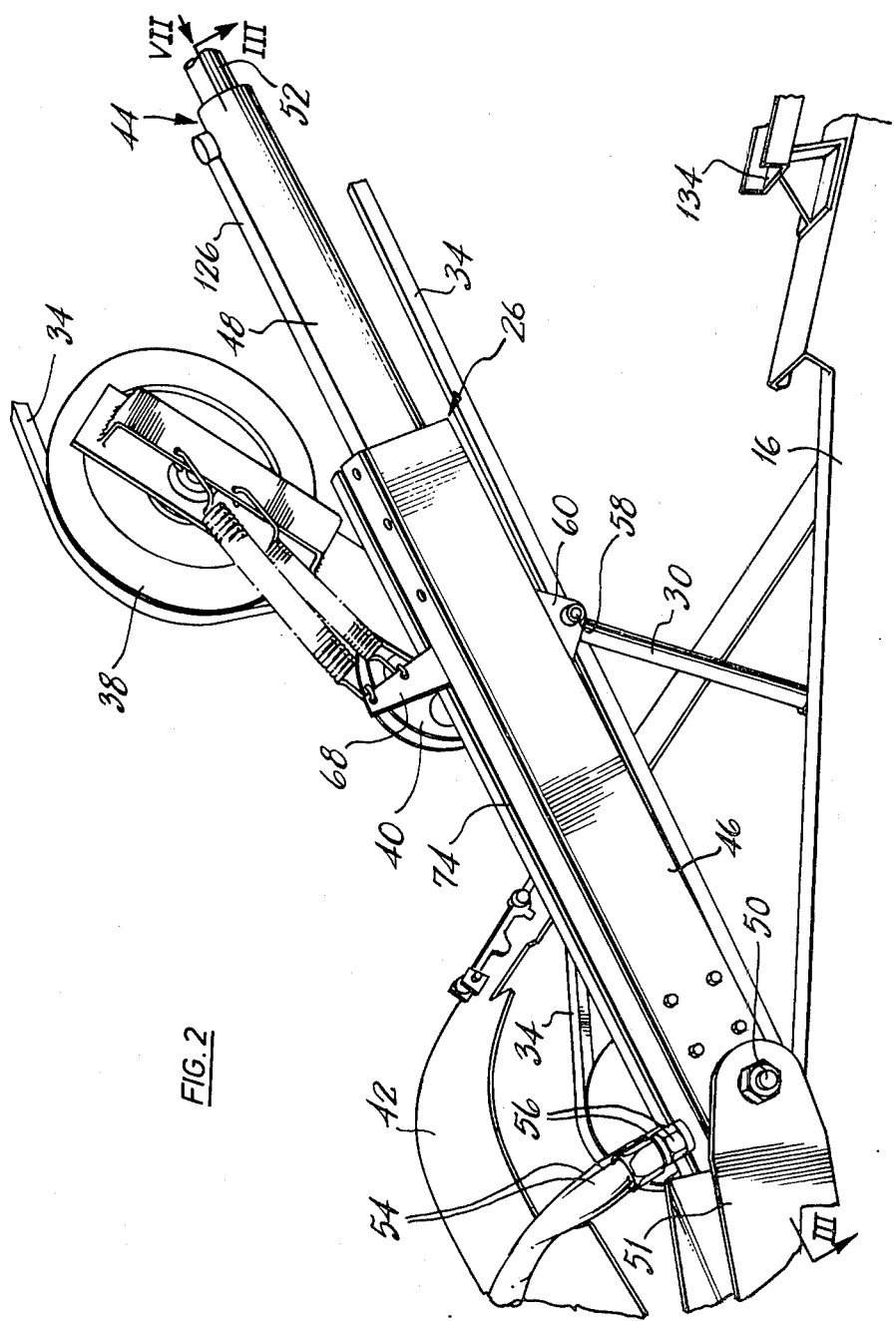
FIG. 2 shows a perspective view in the direction indicated by arrow II in FIG. 1 of part of one of the reel support arms including a hydraulic ram.

As shown in FIG. 2, reel support arm 26 comprises a piston and cylinder assembly in the form of a double-acting hydraulic ram 44. A mounting member 46 for ram 44 is fastened at its forward end to the cylinder 48 of the ram, and is pivotally connected by a spindle 50 at its rear end to a pair of flanges 51 on the crop gathering platform 16. Reel 24 is mounted on a piston rod 52 of ram 44, as will be described. A pair of hydraulic supply hoses 54 for ram 44 are fastened to respective hydraulic couplings 56 at the rear end of mounting member 46.

Reel lift ram 30 is pivotally connected to arm 26 by a pin 58 passing through a pair of apertured ears 60 provided on mounting member 46.

FIGS. 3 to 6 show further details of the structure of reel support arm 26. Reel 24 is journalled on the forward end of piston rod 52 by means of a bearing assembly 62 fitting onto a reduced diameter end portion 64 of the piston rod and retained by a bolt 66.

Mounting member 46 is in the form of a hollow housing to receive the rearward end of piston 52. A bracket 68 having a sleeve 70 received on a reduced diameter end portion 72 of piston rod 52 projects through an elongated slot 74 terminating in a cut-out 75 formed in housing 46. Sleeve 70 is retained by a pin 73.

Guide pulley 40 is journalled on a spindle 76 fastened to one side of housing 46. A lever 78 is pivoted at one end on spindle 76 and belt tensioning pulley 38 is journalled on its other end.

A pair of tension springs 79 interconnect bracket 68 and an attachment 80 mounted on the same spindle 82 as tensioning pulley 38, to pull lever 78 rearwards and thereby tension belt 34.

A driving pulley 84 for belt 34 is journalled on spindle 50 at the rear end of housing 46 and has a sprocket 86 bolted to it. Drive for reel 24 is transmitted from a chain (not shown) to sprocket 86 and thence to belt 34 via pulley 84. Housing 46 is pivoted on spindle 50 through a sleeve 88 braced by a web 90.

Figure 8:
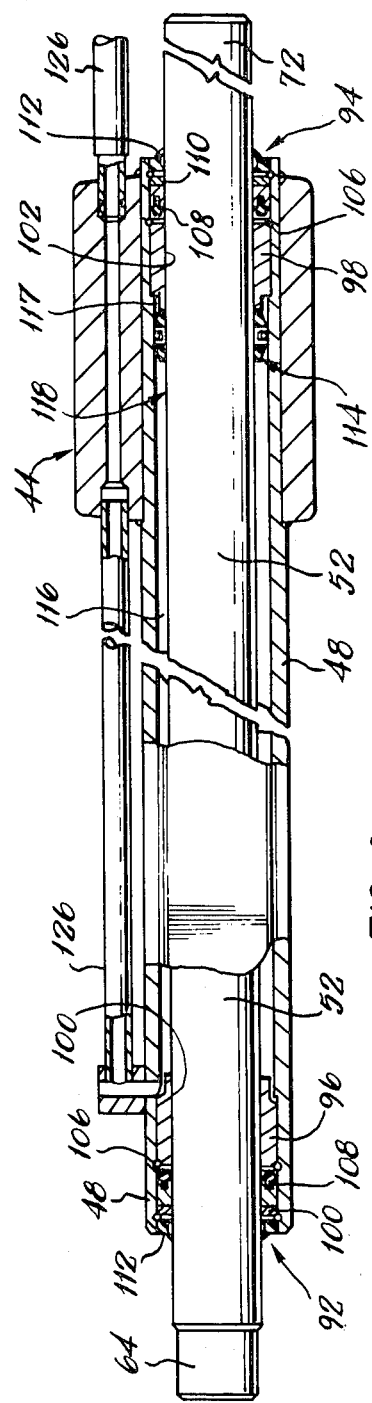
FIGS. 8 and 9 show sections through the ram of FIG. 7 on the lines VIII—VIII and IX—IX therein.
Figure 9:
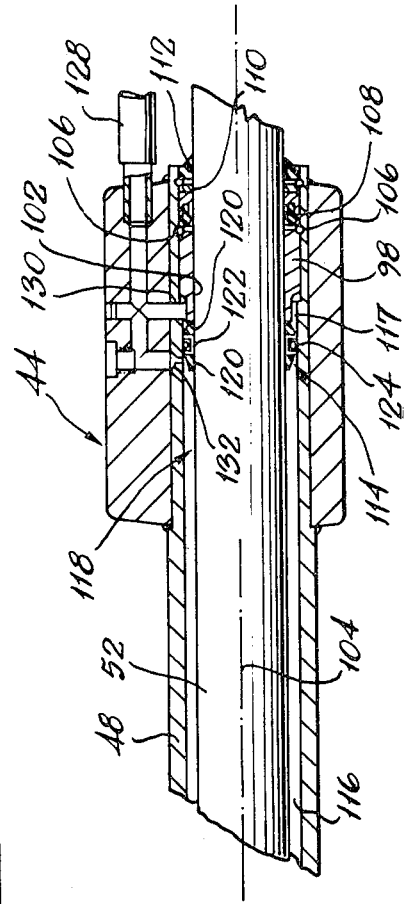
Figure 7:
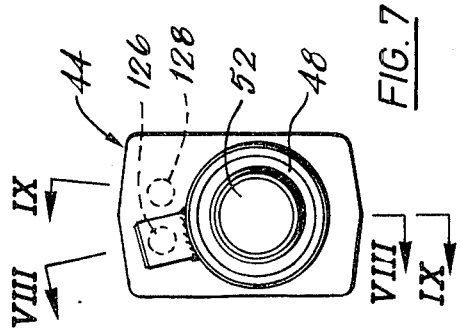
FIG. 7 shows an end view of the hydraulic ram of FIG. 2 as indicated by arrow VII in FIG. 2.

Referring now to FIGS. 7, 8 and 9 of the drawings, it will be seen that cylinder 48 is open at both ends and that the opposite ends 64, 72 of piston rod 52 project through their respective openings 92, 94.

A pair of bronze bearing sleeves 96, 98 are provided within cylinder 48, one adjacent each end thereof. Sleeves 96, 98 provide respective annular load-bearing lands 100, 102 spaced apart axially with respect to the longitudinal axis 104 of ram 44. Piston rod 52 is slidably supported on the lands 100, 102.

Bearing sleeves 96, 98 each fit into respective end portions of cylinder 48 of slightly enlarged internal diameter, and are retained axially by circlips 106. Axially outwardly of each of the bearing sleeves there is provided, in succession, a lip type seal 108 of rubber mounted on a seal support for sealing engagement with piston rod 52, a seal retaining collar 110 and circlip, and a dust ring 112 of hard rubber.

An annular sealing member 114 is secured to piston rod 52 between bearing sleeves 96, 98 and divides the annular space between the piston rod and the internal surface of cylinder 48 into front and rear chambers 116, 117 respectively. Piston rod 52 and sealing member 114 together constitute the piston 118 of hydraulic ram 44. The thrust generated by the ram, in use, derives entirely from hydraulic pressure acting on the sealing member. Piston 118 and cylinder 48 of ram 44 constitute, for the purpose of defining the invention, first and second sliding members.

Sealing member 114 comprises a pair of frusto conical steel rings 120 welded to piston rod 52 and defining therebetween a space in which is located an annular channel-section member 122 of polytetrafluoroethylene and fibre glass. An O-ring seal 124 is located in the channel section member for sliding and sealing engagement with the internal surface of cylinder 48.

Hydraulic fluid conduits 126, 128 lead to the front and rear chambers 116, 117 respectively of the ram from hydraulic couplings 56 (see FIG. 2) to permit fluid flow to and from said chambers.

The right hand reel support arm 28 is constructed and arranged in a manner similar to reel support arm 26 apart from not having the reel drive mounted thereon. The hydraulic rams of the two reel support arms are hydraulically interconnected in series so that both are actuable simultaneously by a hydraulic pump (not shown) driven by the engine of combine 10. Accordingly conduit 128 is connected to the front chamber of the ram of reel support arm 28. Conduit 126 in ram 44 and the conduit in the other ram which corresponds to conduit 128, are connectible selectively by means of a manually operable valve (not shown) to the pump — in order to extend or retract the rams.

It will be noted from FIG. 9 that conduit 128 terminates in a main port 130 and a restricted port 132. These ports are spaced axially so that when piston 118 is retracted to the end of its stroke, the restricted port then opens into front chamber 116 of the ram, thereby permitting a slow but continued flow of fluid to the other ram, if necessary, to ensure that both pistons reach the ends of their strokes. The rams are thus sequenced.

The hydraulic rams of the reel support arms 26, 28 permit reel 24 to be adjusted forwards and rearwards relative to the crop gathering platform 16 as a whole, and relative to cutterbar 18 (which is mounted thereon) in particular. A pair of guide ramps 134, 136 are mounted on the end walls of platform 16 for engagement with respective guide followers 138 which are mounted on and project downwards from the ends of the reel. The guide ramps guide the guide followers (and therefore the reel also) upwards relative to cutterbar 18 when the reel is moved rearwards from its foremost position with the reel support arms in their lowest position. It will be appreciated that the ramps 134, 136 enable reel 24 to be easily positioned so that its tines pass very close to but do not foul cutterbar 18 and draper conveyor 20.

In use, reel 24 is set to its desired position relative to cutterbar 18 by extension or retraction of the reel lift rams 30, 32 and the rams of the reel support arms 26, 28. FIG. 1 shows the reel in a fully raised and fully forward position for illustration purposes.

The reel 24 gathers a standing crop and, as the crop is severed by the cutter bar 18, feeds the crop headfirst onto draper conveyor 20 which delivers it to auger 22. The auger conveys the crop laterally inwardly and feeds it rearwards for onward transmission to the main body 12 of the combine for threshing and separation of grain.

The weight of reel 24 is entirely supported by reel support arms 26, 28 in cantilever fashion. The bending loads thereby exerted on the rams of the reel support arms are easily supported by virtue of the fact that the pistons 118 thereof are slidably supported on the widely-spaced load-bearing lands 100, 102 of the cylinders 48 — the spacing of the lands being unaffected by extension or retraction of the ram.

When the reel support arms are extended or retracted, the tension in the reel drive belt 34 is maintained by tensioning pulley 38 which is able to swing forwards and rearwards on lever 78 to which a fairly constant belt tensioning force is applied by tension springs 79.

Among the advantages provided by the embodiment of the invention described above are the following:

1. the dual function of the rams 44 of the reel support arms means that no additional weight-supporting structure extending between the reel and the crop gathering platform is needed. This results in cost savings;

2. the fact that the sliding surfaces by which the reel support arms extend and retract (lands 100, 102) are inside the rams means that these surfaces are permanently lubricated and not liable to corrosion and therefore the risk of jamming is minimized;

3. guide ramps 134, 136 enable the reel to be guided upwards around the exact contours of cutterbar 18 and conveyor 20 instead of being limited to linear movement imposed on it by stops engageable with the reel support arms.

It will be appreciated that, for the purpose of the invention, it is not necessary for the load bearing lands on which the piston slides to be on the cylinder. For example the piston rod could be provided with two collars fastened to it which both slide on the inner surface of the cylinder — though this arrangement would require a longer cylinder for a given piston stroke.

Furthermore, the invention is in no way limited to any particular form of drive for reel 24 and, for example, a hydraulic motor could be mounted in place of pulley 36 at the end of reel support arm 26, and the belt drive shown in the drawings dispensed with.

The term "load-bearing lands" as used in this specification refers to bearing surfaces for sliding engagement with a piston or cylinder and capable of supporting in cantilever fashion the loads imposed on the reel support arms by the weight of the reel. Accordingly, the term does not include such items as dust rings, sealing rings, seal retaining rings and the like which may for example slidingly engage a piston but which are not designed for supporting loads.

We claim:

1. Crop gathering apparatus comprising:
a crop gathering platform;
a crop gathering reel; and
a pair of reel support arms, one arm at each end of the crop gathering reel, the reel being mounted on the crop gathering platform by said reel support arms, said reel support arms extending forwardly with respect to the direction of usual forward motion of the crop gathering apparatus, said reel support arms also being length-adjustable to provide forward and rearward adjustment of the position of the reel relative to the platform;
characterized in that at least one of said reel support arms comprises first and second sliding members forming part of a piston and cylinder assembly actuable by hydraulic fluid; and that load bearing lands are formed within said piston and cylinder assembly on one of said sliding members, said load bearing lands being spaced apart axially with respect to the longitudinal axis of the piston and cylinder assembly; and that the piston of said piston and cylinder assembly is slidably supported on said load bearing lands for movement relative to the cylinder thereof without changing the axial spacing of said lands whereby said lands can support bending loads imposed on the piston and cylinder assembly by the weight of the reel.

2. Crop gathering apparatus according to claim 1 characterized in that said load-bearing lands are provided on said cylinder and that said piston comprises a piston rod slidable on said lands and an annular sealing member secured to the piston rod and slidingly engaging the internal surface of the cylinder between said lands.

3. Crop gathering apparatus according to claim 2 characterized in that said cylinder is formed with an opening at each end through which the opposite ends of said piston rod project, the reel being mounted on one end of the piston rod.

4. Crop gathering apparatus according to claim 3 characterized in that said one reel support arm further comprises a mounting member fastened at one end to said cylinder and pivotally connected at its other end to the crop gathering platform.

5. Crop gathering apparatus according to claim 4 characterized in that said mounting member is in the form of a housing to receive the other end of the piston rod.

6. Crop gathering apparatus according to claim 4 characterized by an upwardly extending hydraulic reel lift ram acting between said mounting member and the crop gathering platform.

7. Crop gathering apparatus according to claim 1 characterized in that each of said reel support arms has its own piston and cylinder assembly with axially spaced load-bearing lands within said assembly, said cylinders being connected in series so as to be actuable by a single source of hydraulic fluid.

8. Crop gathering apparatus according to claim 7 characterized by a main passage and a restricted passage interconnecting said cylinders for the passage of hydraulic fluid, the arrangement being such that movement of the piston of one of said piston and cylinder assemblies to the end of its stroke uncovers the restricted passage, thereby permitting continued flow of fluid to the other assembly, if necessary, to ensure both pistons reach the ends of their strokes.

9. Crop gathering apparatus according to claim 3 characterized by a belt or chain drive to rotate the crop gathering reel, a rotatable tensioning member engaging the belt or chain of said drive, and resilient connecting means interconnecting the tensioning member and the other end of said piston rod remote from the reel.

10. Crop gathering apparatus according to claim 9 characterized in that said one reel support arm further comprises a mounting member in the form of a housing fastened at one end to the cylinder, the housing being pivotally mounted at its other end on the crop gathering platform, and that said resilient connecting means comprises a bracket fastened to said other end of said piston rod, the bracket projecting through an elongated slot formed in the housing, and that said resilient connecting means further comprises a tension spring interconnecting the bracket and a pivotally mounted lever on which said rotatable tensioning member is journalled.

11. Crop gathering apparatus according to claim 1 characterized by a cutterbar mounted at the front of the crop gathering platform, a guide ramp on the crop gathering platform and a guide follower connected to the reel and engageable with ramp to guide the reel upwards relative to the cutterbar as the piston and cylinder assembly is retracted.

* * * * *